United States Patent
Allen et al.

(10) Patent No.: US 6,435,835 B1
(45) Date of Patent: Aug. 20, 2002

(54) ARTICLE HAVING CORROSION RESISTANT COATING

(75) Inventors: William Patrick Allen, Portland; Walter E. Olson, Vernon, both of CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/467,517

(22) Filed: Dec. 20, 1999

(51) Int. Cl.$^7$ .................................................. F01D 5/14
(52) U.S. Cl. .................................................. 416/241 R
(58) Field of Search .................................... 416/241 R

(56) References Cited

U.S. PATENT DOCUMENTS

| | | | |
|---|---|---|---|
| 4,132,816 A | 1/1979 | Benden et al. | 427/237 |
| 4,148,275 A | 4/1979 | Benden et al. | 118/49.5 |
| 4,209,348 A | 6/1980 | Duhl et al. | 148/3 |
| 4,643,782 A | 2/1987 | Harris et al. | 148/404 |
| 4,719,080 A | 1/1988 | Duhl et al. | 420/443 |
| 4,921,405 A * | 5/1990 | Wilson | 416/241 R |
| 5,068,084 A | 11/1991 | Cetel et al. | 420/443 |
| 5,451,142 A * | 9/1995 | Cetel et al. | 416/241 R |
| 5,712,050 A * | 1/1998 | Goldmann et al. | 416/241 R |
| 5,837,385 A * | 11/1998 | Schaeffer et al. | 416/241 R |
| 5,993,980 A * | 11/1999 | Schmitz et al. | 416/241 R |
| 6,042,951 A * | 3/2000 | Kojima et al. | 416/241 R |
| 6,129,991 A * | 10/2000 | Warnes et al. | 416/241 R |
| 6,149,389 A * | 11/2000 | Hennies et al. | 416/241 R |
| 6,153,313 A * | 11/2000 | Rigney et al. | 416/241 R |

* cited by examiner

*Primary Examiner*—John Kwon
(74) *Attorney, Agent, or Firm*—F. Tyler Morrison

(57) ABSTRACT

According to the invention, an article that is exposed to high temperatures, e.g., over 1000° C. during operation is disclosed. In one embodiment, a turbine blade for a gas turbine engine includes a directionally solidified metallic substrate, e.g., a superalloy, which defines an airfoil, a root and a platform located between the blade and root. The platform has an underside adjacent the root, and a corrosion resistant noble metal-containing aluminide coating is located on portions of the blade susceptible to corrosion and/or stress corrosion cracking, such as the underside of the platform and the neck. The applied coating prevents corrosion and stress corrosion cracking of blade in these regions.

10 Claims, 2 Drawing Sheets

ARTICLE HAVING CORROSION RESISTANT COATING

CROSS REFERENCE TO RELATED APPLICATIONS

Some of the subject matter disclosed herein is also disclosed in commonly owned pending applications Ser. Nos. 09/467,516 entitled "Article Having Corrosion Resistant Coating" by Allen, Olson, Shah an Cetel, 09/468,389 entitled "Article Having Corrosion Resistant Coating" by Shah and Cetel and 09/467,202 entitled "Methods of Providing Article With Corrosion Resistant Coating and Coated Article" and by Allen, Olson, Shah and Cetel.

BACKGROUND OF THE INVENTION

The present invention relates generally to coatings for corrosion protection, and more particularly to n article having such a coating.

Gas turbine engines are well developed mechanisms for converting chemical potential energy, in the from of fuel, to thermal energy and then to mechanical energy for use in propelling aircraft, generating electric power, pumping fluids etc. One of the primary approaches used to improve the efficiency of gas turbine engines is the use of higher operating temperatures. In the hottest portion of modern gas turbine engines (i.e., the primary gas flow path within the engine turbine section), turbine airfoil components, cast from nickel or cobalt based alloys, are exposed to gas temperatures above their melting points. These components survive only because cooling air is passed through a cavity within the component. The cooling air circulates through this cavity reducing component temperature and exits the component through holes in the component, where it then mixes with the hot gasses contained within the primary flow path. However, providing cooling air reduces engine efficiency.

Accordingly, there has been extensive development of coatings for gas turbine hardware. Historically, these coatings have been applied to improve oxidation or corrosion resistance of surfaces exposed to the turbine gas path. More recently, thermal barrier coating have been applied to internally cooled components exposed to the highest gas path temperatures so that the amount of cooling air required can be substantially reduced. Since coatings add weight to a part without adding structural strength,and can debit fatigue life, application of the coating is intentionally limited to those portions of the component for which the coating is necessary to achieve the required durablity. In the case of rotating parts such as turbine blades, the added weight of a coating adds significantly to blade pull, which in turn requires stronger and/or heavier disks. Thus there is added motivation to restrict use of coatings to those portions of the blade (typically the primary gas path surfaces) where it is absolutely required.

With increasing gas path temperature, turbine components or portions of components that are not directly exposed to the primary turbine gas path may also exposed to relatively high temperatures during service, and therefore may also require protective coatings. For example, portions of a turbine blade that are not exposed to the gas path (such as the portion of a turbine blade defined by the underside of the platform, the blade neck, and attachment serration) can be exposed to temperatures of 1200 F. or higher during service. These blade locations are identified by 18 and 19 in FIG. 1. It is expected that the temperatures these portions of the blade are exposed to will continue to increase as turbine operating temperatures increase.

The present invention describes application of a corrosion-resistant coating to portions of turbine blades not directly exposed to the hot gas stream to improve component durability.

It is another object of the invention to provide a corrosion-resistant coating to prevent stress corrosion cracking on portions of components that are not directly exposed to a hot gas stream.

It is yet another object of the invention to provide such a coating to protect against stress corrosion cracking of turbine blades in regions under the blade platform.

SUMMARY OF THE INVENTION

According to one aspect of the invention, improved durability of gas turbine blades is achieved through application of improved corrosion resistant coatings. A turbine blade for a gas turbine engine, typically composed of a directionally solidified nickel-based superalloy, consists of an airfoil, a root and a platform located between the blade airfoil and root. The platform has an underside adjacent the blade neck, and the blade neck is adjacent to the blade root.

A corrosion resistant platinum aluminide coating is applied to the underside of the platform and portions of the blade neck. To maximize corrosion protection, the coating should possess between about 30–45 wt. % platinum, balance primarily aluminum and nickel. The presence of this coating improves component life by resisting corrosion by the sulfate salts accumulating on regions of the component which are shielded from direct exposure to the gas path. An additional benefit of the applied coating is the prevention of stress corrosion cracking. The corrosion resistant coating prevents corrosion and/or stress corrosion cracking by acting as a barrier between a salt and the underlying nickel-based alloy component.

DETAILED DESCRIPTION OF THE PREFERRED EMBODIMENTS

Figure 1:
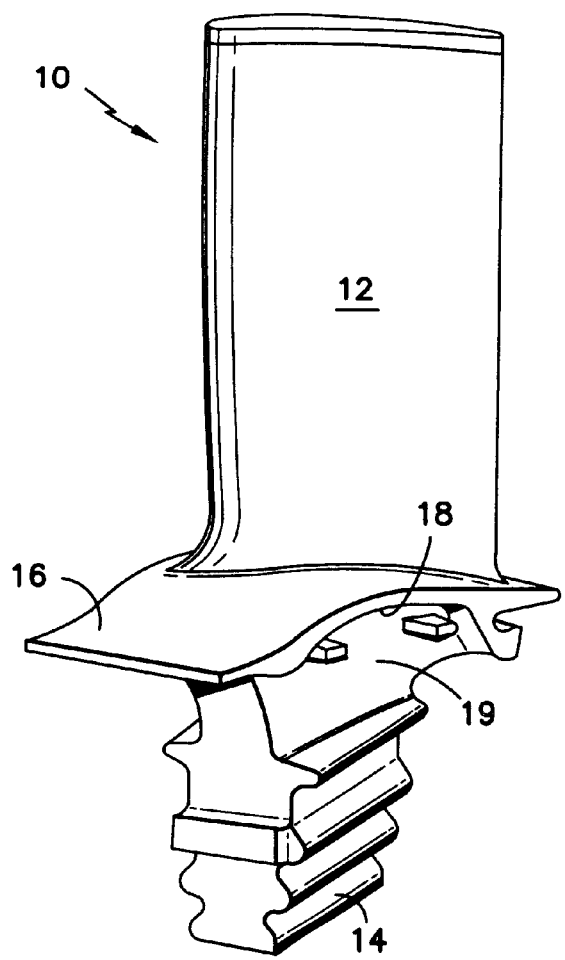
FIG. 1 is an illustration of a superalloy article in accordance with the present invention.

As illustrated in FIG. 1, a turbine blade composed of a superalloy material and incorporating the present invention is illustrated generally by the reference numeral 10. The turbine blade includes an airfoil 12, a serrated blade root 14 (used to attach the blade to the rotatable turbine disk) and a platform 16 located between the airfoil and serrated root. The region between the underside of the blade platform 18 and the root is referred to as the neck 19. Typically, turbine blades (and other gas turbine engine components) are composed of a directionally solidified nickel-based alloy, e.g., including a single crystal or with multiple columnar grains oriented parallel to the direction of growth. Typical compositions of exemplary alloys are shown in Table 1. U.S. Patents describing columnar and single crystal and directionally solidified alloys include U.S. Pat. Nos. 4,209,348; 4,643,782; 4,719,080; 5,068,084. Cooling holes, which may be positioned on one or more portions of a turbine blade may be provided for flowing cooling air over the specific portions of the airfoil during operation, as is known generally in the art.

TABLE 1

COMPOSITION OF COLUMNAR AND SINGLE CRYSTAL ALLOYS

| Alloy | Type | Ni | Co | Cr | Al | Mo | Ta | W | Re | Hf | Ti | Nb |
|---|---|---|---|---|---|---|---|---|---|---|---|---|
| PWA 1422 | DS | Bal. | 10 | 9 | 5 | — | — | 12.5 | — | 1.6 | 2 | 1 |
| DS R80H | DS | Bal. | 9.5 | 14 | 3 | 4 | — | 4 | — | 0.75 | 4.8 | — |
| CM247LC | DS | Bal. | 9.2 | 8.1 | 5.6 | 0.5 | 3.2 | 9.5 | — | 1.4 | 0.7 | — |
| PWA 1480 | SC | Bal. | 5 | 10 | 5 | — | 12 | 4 | — | — | 1.5 | — |
| PWA 1484 | SC | Bal. | 10 | 5 | 5.65 | 1.9 | 8.7 | 5.9 | 3 | 0.1 | — | — |
| Rene' N5 | SC | Bal. | 7.5 | 7 | 6.2 | 1.5 | 6.5 | 5 | | 0.15 | — | — |
| CMSX-4 | SC | Bal. | 9 | 6.5 | 5.6 | 0.6 | 6.5 | 6 | 3 | 0.1 | 1 | — |

It was discovered that the alkali and alkaline earth sulfate salts responsible for elevated temperature corrosion of turbine components (varying mixtures of sodium, potassium, calcium and magnesium sulfates) can accumulate on regions of the blade outside of the turbine gas path. These salts can be ingested with the inlet air in marine environments or form as a result of combustion processes. Corrosion attack of the blade by these salts is typically very limited at temperatures below the salt melting temperature (about 1100° F.). With increased turbine operating temperature, however, even regions of the blade shielded from the gas path can exceed the melting temperature of the sulfate salt resulting in accelerated corrosion of the blade neck and underside of the platform. It was also discovered that at sufficiently high stress levels, the presence of these salts may result in stress corrosion cracking of directionally solidified nickel-based turbine alloys having a single crystal or columnar grain structure. Stress corrosion cracking of these materials represents a newly discovered phenomenon.

Figure 1A:
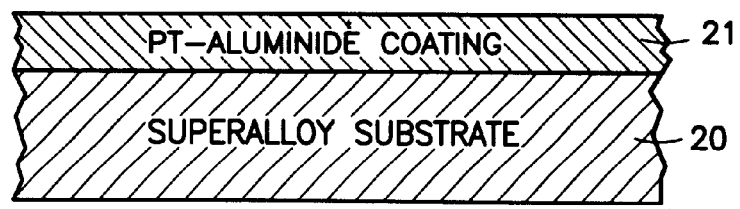
FIG. 1a is a schematic illustration of a coating applied to the article of FIG. 1.

According to one aspect of the current invention, a corrosion-resistant noble metal containing aluminide coating (21 in FIG. 1a) is applied to portions of the superalloy substrate 20, such as the underside of the platform 18 and the neck 19 of a turbine blade, to prevent corrosion and/or stress corrosion cracking of the blade in these locations. The coating is preferably characterized by the single phase beta-(Ni,Pt)Al microstructure known to those skilled in the art. While the present invention is illustrated in FIG. 1 as a turbine blade, the present invention is not limited to any particular component. Portions of other components shielded from the primary turbine gas path that are exposed to relatively high stress and corrosive conditions would also be expected to benefit from this invention.

In the illustrated embodiment of this invention, the coating applied to the under-platform surfaces 18 and 19 is preferably a platinum aluminide coating, containing between about 11–65 wt. % platinum, more preferably about 30–55 wt. % platinum and most preferably 30–45 wt. % platinum with the balance primarily aluminum and nickel. This composition is measured near the surface of the coating, e.g., not deeper than the outer 20% of the total coating thickness. Surprisingly, platinum aluminide coatings having lesser and greater amounts of the most preferred platinum level do not provide the desired level of protection against corrosion. Other noble metals in an aluminide coating, particularly palladium and rhodium, could also be employed, but platinum is presently preferred and as used herein is intended to include these other materials. The coating may also include other elements such as yttrium, hafnium and/or silicon to provide further improvements in oxidation or corrosion resistance. While the coating may be applied by various processes, we have used application of the platinum layer by plating, followed by an out-of-pack aluminizing process to cover and diffuse with the plated platinum layer, in the present illustration. The platinum may also be applied by sputtering or other suitable process, and the aluminum may be deposited by in-pack processes or by vapor deposition with other suitable processes. The out-of-pack aluminizing process is typically also used to coat internal passages of components such as turbine blades and has also been used to coat the surfaces exposed to the primary turbine gas path, e.g., the airfoil surfaces.

By way of example, turbine blades were coated according to the present invention. The blades were composed of a nickel base superalloy having a nominal composiiton in weight percent of: 10 Co, 5 Cr, 5.65 Al, 1.9 Mo, 8.7 Ta, 5.9 W, 3 Re, 0.1 Hf, balance Ni. The underplatform surfaces, including the blade neck were plated with platinum by immersing those surfaces in a plating bath of hexachloroplatanic acid maintained at a temperature of about 165–180° F. (74–82° C.). Portions of the blade root are generally not plated, and these and other portions where plating is not desired may be masked. The plating time will depend upon the plating solution concentration and the the thickness of plating layer to be applied. For purposes of the present invention, platinum layers having a thickness of between about 0.15–0.3 mils were used with good results, although substantially thicker or thinner layers may also be employed.

After necessary portions of the blade have been plated with platinum, the component is subjected to an aluminizing process to apply an aluminide layer to the desired portions of the article, including the plated portion. Aluminizing of articles to produce a platinum aluminide coating was performed as described in commonly-owned U.S. Pat. Nos. 4,132,816 and 4,148,275 both to Benden et al. Such an aluminide process has been used for coating external and/or internal surfaces of airfoils. Other processes and equipment could also be used with equal effect.

The noble metal-modified aluminide coating is applied to the blade under-platform surfaces and neck up to a maximum thickness of about 0.005" (~125 $\mu$m) to provide corrosion and/or stress corrosion cracking resistance. The final coating thickness achieved will be determined by the thickness of the initial noble metal plated layer and the temperatures and times used for the aluminizing process and any post coating diffusion heat treatments. For rotating applications, such as turbine blades, the coating thickness should be adequate to ensure complete coverage of the area to be coated and achieve the corrosion life necessary for providing protection for a typical blade service interval. The maximum allowable coating thickness may be limited by the fatigue debit associated with the presence of a coating. Accordingly, the final coating thickness for rotating components is preferably less than about 0.005" (~5 mils) and greater than 0.001" (1 mil), and more preferably less than about 0.003" (~3 mils).

Figure 2:
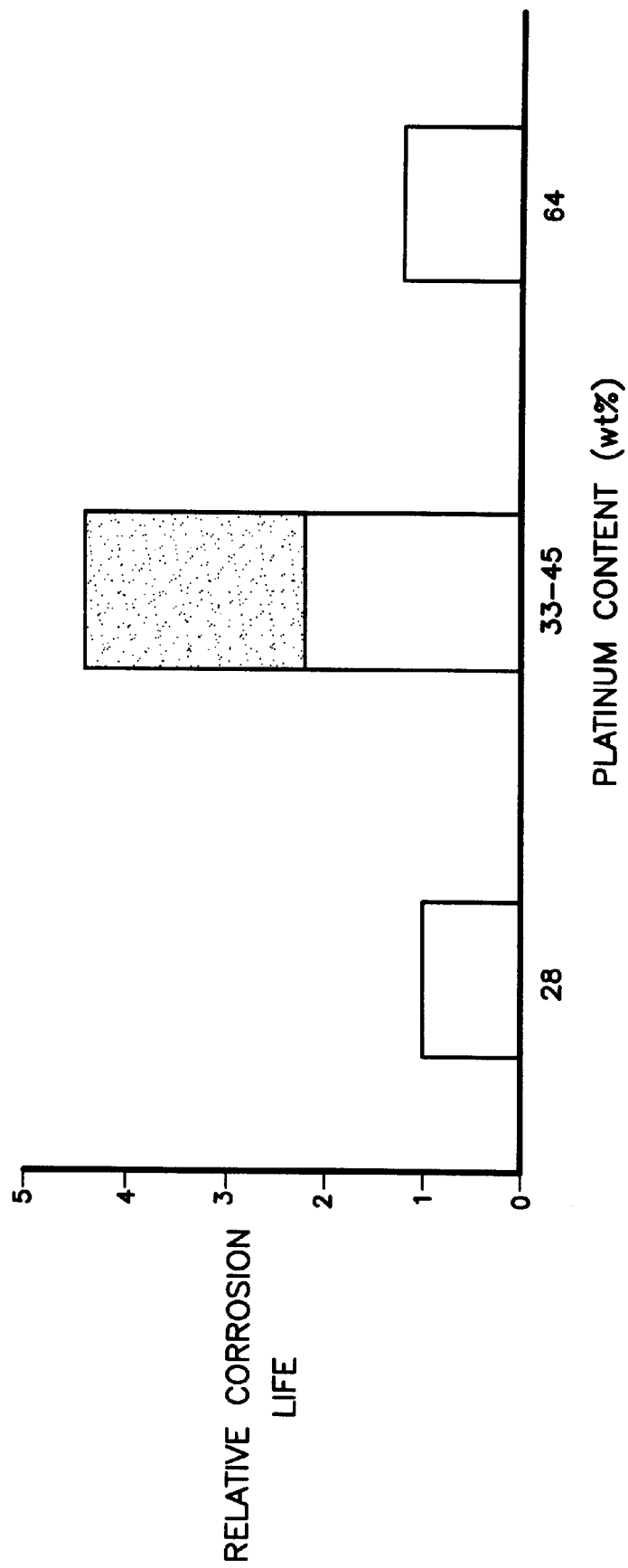
FIG. 2 illustrates the corrosion life improvement achieved with the inventive platinum aluminide coatings.

FIG. 2 illustrates the corrosion life improvement achieved through application of coatings disclosed in this invention. Corrosion testing of the coated blade with the most preferred range of platinum content at a temperature of 1350° F. in the presence of sulfate salt and $SO_2$ showed a 2–4× improvement in corrosion life relative to the uncoated blade. Application of the same coating to test specimens was also shown to prevent stress corrosion cracking.

The present invention can also be used in the repair or refurbishment of parts subject to stress corrosion cracking, such as turbine blades. In some cases, the blade may have been provided with an aluminide coating over the external surface of the blade. The aluminide coating on the under-platform surface, or any portion subject to stress corrosion cracking is stripped of the existing alumininde, e.g., by acid stripping or other suitable process, and a noble metal layer is plated as described above. The aluminizing step is then performed as described above. Alternatively, the noble metal may be plated directly on whatever aluminide layer exists on the surface to be coated, after the existing layer is cleaned, if needed.

The present invention provides a significant improvement over the prior art. Field experience has shown that blades without coating in these areas can be subject to severe corrosion damage during service. Using a noble metal containing aluminide coating of the preferred compositions on selected portions of an article subjected to high temperatures, such as the under platform surface of a turbine blade, provides superior corrosion and stress corrosion protection during operation.

While the present invention has been described above in some detail, numerous variations and substitutions may be made without departing from the spirit of the invention or the scope of the following claims. For example, the platinum can be plated over an existing aluminide layer, e.g., during repair followed by a subsequent aluminizing over the plating layer. Accordingly, it is to be understood that the invention has been described by way of illustration and not by limitation.

What is claimed is:

1. A turbine blade for a gas turbine engine comprising a superalloy substrate defining an airfoil, a root, and a platform located between the blade and root, the platform has an underside adjacent the root, and a corrosion resistant noble metal-containing aluminide coating on the underside of the platform and blade neck.

2. The turbine blade of claim 1, wherein the aluminide coating is a platinum aluminide coating.

3. The turbine blade of claim 1, wherein the coating contains about 11–60 wt. % platinum, balance primarily aluminum and nickel.

4. The turbine blade of claim 1, wherein the coating contains about 25–55 wt. % platinum, balance primarily aluminum and nickel.

5. The turbine blade of claim 1, wherein the coating contains about 30–45 wt. % platinum, balance primarily aluminum and nickel.

6. The turbine blade of claim 1, wherein the coating has a nominal thickness of less than about 0.005".

7. The turbine blade of claim 1, further comprising a platinum aluminide layer applied over an existing aluminide coating.

8. The turbine blade of claim 1 wherein the substrate is composed of a directionally solidified nickel-based alloy.

9. The turbine blade of claim 1 wherein the substrate is comprised of a columnar grain nickel-based alloy.

10. The turbine blade of claim 1 wherein the substrate is comprised of a single crystal nickel-based alloy.

* * * * *